United States Patent [19]
Satran et al.

[11] Patent Number: 5,622,460
[45] Date of Patent: Apr. 22, 1997

[54] CHIP CUTTING TOOL WITH ACUTELY ANGLED POCKET SIDE WALLS

[75] Inventors: Amir Satran, Kfar Vradim; Yuri Men, Haifa, both of Israel

[73] Assignee: Iscar Ltd., Migdal Tefen, Israel

[21] Appl. No.: 360,522

[22] Filed: Dec. 21, 1994

[30] Foreign Application Priority Data

Dec. 21, 1993 [IL] Israel ................................ 108115

[51] Int. Cl.$^6$ ........................................... B23C 5/14
[52] U.S. Cl. ................................... 407/42; 407/54
[58] Field of Search ........................... 407/42, 54, 57, 407/62, 63, 113, 114

[56] References Cited

U.S. PATENT DOCUMENTS

| | | | |
|---|---|---|---|
| 4,512,689 | 4/1985 | Bylund | 407/40 |
| 4,527,930 | 7/1985 | Harroun | 407/42 |
| 4,940,369 | 7/1990 | Aebi et al. | 407/42 |
| 5,017,055 | 5/1991 | Tsujimura et al. | 407/113 |
| 5,221,162 | 6/1993 | Okawa | 407/40 |
| 5,294,219 | 3/1994 | Shiratori et al. | 407/34 |
| 5,443,335 | 8/1995 | Shimano et al. | 407/113 |

OTHER PUBLICATIONS

Japanese Laid Open Publication No. 1-310808 (See English abstract attached).

Primary Examiner—M. Rachuba
Assistant Examiner—Kenneth J. Hansen
Attorney, Agent, or Firm—Pennie & Edmonds

[57] ABSTRACT

A chip cutting tool for rotary machining operations comprising a tool holder formed with an insert retaining pocket adjacent a leading end thereof and a cutting insert clampingly and releaseably retained therein. The cutting insert has top and base surfaces, two pairs of opposite major and minor side surfaces and at least one cutting edge defined at an intersection between an upper, relief flank surface of a first major side surface and the top surface of the insert. The cutting edge has first and second cutting edge portions, the relief flank surface of the cutting edge at least adjacent the second portion thereof being directed at an internal acute angle to the insert base surface. At least a portion of the second major side surface of the insert is substantially co-directional with the second portion of the cutting edge. When the cutting edge is in its operative position, the first portion of the cutting edge is disposed substantially radially and the second portion of the cutting edge is substantially co-directional with an axis of rotation of the tool and located above the reference plane. The second major side surface and the associated minor side surface of the insert are disposed within the pocket, converge in the direction away from the cutting edge and abut, with their abutting portions, respective side walls of the pocket, an abutting portion of the second major side surface being disposed at the portion thereof co-directional with the cutting edge.

20 Claims, 9 Drawing Sheets

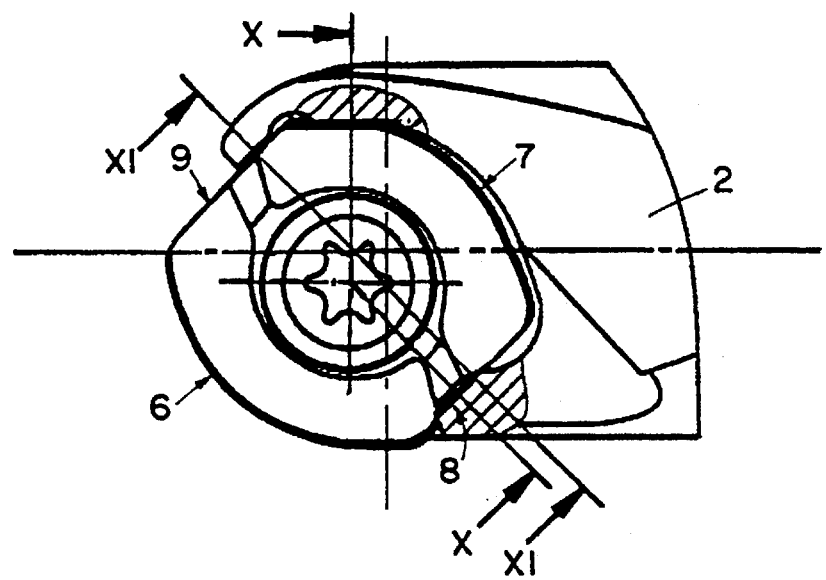
Fig. 9
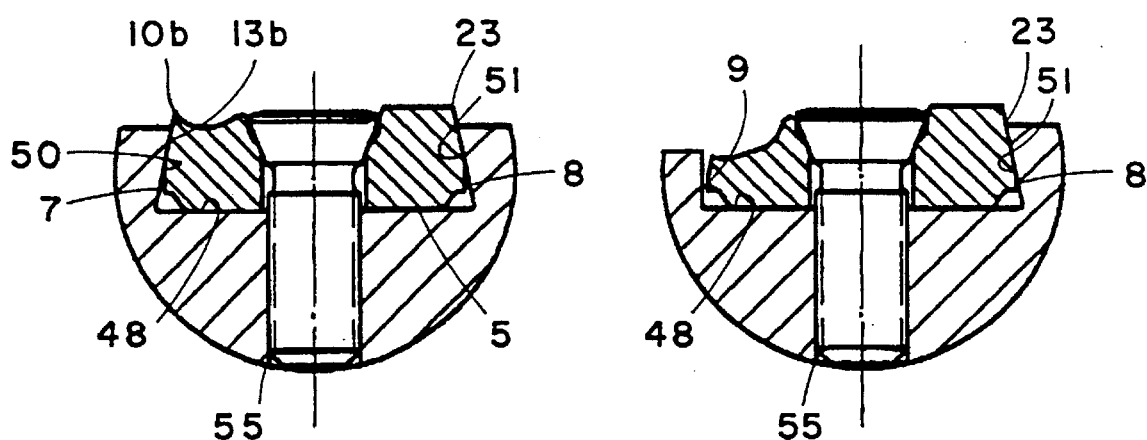
Fig. 10                    Fig. 11

CHIP CUTTING TOOL WITH ACUTELY ANGLED POCKET SIDE WALLS

FIELD OF THE INVENTION

The present invention relates to a chip cutting tool comprising an exchangeable chip cutting insert replaceably mounted on a tool holder and used in rotary operations, such as milling, drilling and turning. In particular, the present invention relates to end mill cutting tools for machining of either plane or irregular shaped surfaces including cavities, narrow slots, rounded grooves or fillets, complicated three-dimensional surfaces, etc. The invention is particularly related to such cutting tools having a small cutting diameter.

BACKGROUND OF THE INVENTION

One particular form of such a chip cutting tool is of the ball-nose type and comprises a tool holder having an insert retaining pocket and a curing insert replaceably mounted and clamped therein. With such a tool, the feed movements of the tool and/or of the workpiece with respect to each other are multidirectional and this, taken together with the curved cutting edge of the insert, gives rise to relatively great cutting force components acting on the insert in general and on the cutting edge in particular. In consequence, the design of the cutting insert, its positioning on and mode of clamping to the tool holder, as well as the design of the retaining pocket, have to be such that these forces do not give rise to damage of the cutting insert and/or its retaining pocket or weaken the secure clamping and positioning of the insert in the pocket whilst, at the same time, allowing for efficient machining.

U.S. Pat. No. 4,512,689 discloses a typical chip cutting tool of this kind. The cutting tool comprises a disk-shaped cutting insert having indexable cutting edges and mounted in an insert retaining pocket of a tool holder by means of a clamping screw so that one of the cutting edges projects out of the pocket constituting thereby an operative cutting edge and at least one other cutting edge being located inside the pocket and constituting an inoperative cutting edge. To ensure secure fixing of the insert in the pocket a base and portions of rear side walls of the insert are adapted to abut respectively a base and side walls of the pocket.

However, this prior disclosure does not deal with problems which arise with tools having relatively small cutting diameters, e.g. about 10 mm or less. These problems involve achieving miniaturization of the tool whilst providing an adequate space for chip forming and evacuation, and all that without decreasing a cross-sectional dimension of the tool body and affecting the strength of the insert and the clamping screw.

It is the object of the present invention to provide a new and improved chip cutting tool, particularly for contouring of shaped surfaces requiring small cutting diameters, where the above problems are effectively solved.

SUMMARY OF THE INVENTION

In accordance with a first aspect of the present invention, there is provided a chip cutting tool for rotary machining operations comprising:

a curing insert having top, base and side surfaces and at least two indexable curing edges formed by the intersection of rake surface and relief flank portions of said top surface and said side surfaces and extending along respective portions of the periphery of the cutting insert;

a tool holder with a longitudinal axis of rotation having an insert retaining pocket formed in a leading head portion of said tool holder and having base and side walls; said insert being secured in said pocket;

screw clamping means for releasably clamping said insert in said pocket with one of said cutting edges and its associated side surface being indexed into an operative cutting position and with its base and at least portions of remaining side surfaces respectively abutting the base and side walls of said pocket; each of said cutting edges, when in its operative position, comprising leading and trailing cutting edge portions with said trailing cutting edge portion being substantially co-directional with said longitudinal axis and being more remote therefrom as compared with said leading cutting edge portion;

characterized in that said trailing cutting edge portion when in its operative position is located above a reference plane parallel to a plan view of the tool and passing through said longitudinal axis, whilst its associated relief flank surface is directed at an internal acute angle to said reference plane; the remaining side surfaces of said insert and the abutting side walls of said pocket respectively, converging towards each other in a direction away from said operative cutting edge; at least one of the converging side walls of said pocket sloping towards the base wall of the pocket at an angle substantially equal to said acute angle so as to be retainably abutted by said relief flank surface of a inoperative cutting edge.

Thus, the fact that in the cutting tool according to the present invention the insert is mounted in the tool holder with its trailing cutting edge portion located above the reference plane allows, on the one hand, for the cutting wedge of the trailing cutting edge portion to be increased, thereby strengthening the cutting edge and, on the other hand, for the provision of a retaining pocket of sufficient depth so that the tool holder is not unduly weakened. All this is achieved whilst at the same time ensuring the provision of adequate space for chip forming and evacuation. It is a specific advantage of the present invention that this design enables an effective clamping of the insert to the tool holder in a substantially dovetail manner so as to be nearly self-holding, rigid but easy to release with the relief flank surface of the inoperative cutting edge used as one of clamping surfaces. Such a manner of clamping ensures that the clamping screw serves only for effective positioning of the insert in the tool holder while any torque which arises during cutting operation of the tool is taken up by the abutting portions of the insert and the pocket. Consequently, decreased stresses are set up in the clamping screw. This enables the screw to have a relatively small diameter. These advantages are particularly useful for miniaturization of cutting tools with very small cutting diameters, e.g. about 10 mm.

Preferably, an internal angle between the relief flank of the cutting edge in its operative position and the base surface of the insert decreases from a maximum value adjacent the leading cutting edge portion to a minimum value adjacent said trailing cutting edge portion.

Preferably, the insert has a substantially disk shape and the insert cutting edges are curved and include an intermediate cutting edge portion between the leading and trailing cutting edge portions. However, the cutting edge portions may also be substantially straight.

In a preferred embodiment of the present invention, each cutting edge is of such a shape so that during rotary operation the leading and intermediate cutting edge portions generate an envelope constituting a segment of a spherical surface having its center on the axis of rotation and the trailing component cutting edge generates an envelope constituting a cylindrical surface. In this case the leading cutting edge portion is located at least partly below the reference plane. The relief flank surface of the intermediate cutting edge portion has preferably a design similar to that of the trailing cutting edge portion.

In a preferred embodiment of the present invention, the base surface of the insert retaining pocket is inclined with respect to the reference plane of the cutting tool at a negative axial angle.

Preferably, the abutting side surface of the insert disposed between the two cutting edges thereof has a bevelled upper portion inclined with respect to the base surface of the insert at an acute angle and the respective converging side wall of the pocket slopes towards the base wall of the pocket at an angle corresponding to that of the bevelled portion.

In accordance with a second aspect of the present invention, there is provided a chip cutting tool for rotary machining operations comprising:

a cutting insert having top, base and side surfaces and a cutting edge formed by the intersection of rake surface and relief flank portions of said top surface and said side surfaces and extending along respective portions of the periphery of the cutting insert;

a tool holder with a longitudinal axis of rotation having an insert retaining pocket formed in a leading head portion of said tool holder and having base and side walls; said insert being secured in said pocket;

screw clamping means for releasably clamping said insert in said pocket with one of said cutting edges and its associated side surface being indexed into an operative cutting position and with its base and at least portions of remaining side surfaces respectively abutting the base and side walls of said pocket; said cutting edge comprising leading and trailing cutting edge portions with said trailing cutting edge portion being substantially co-directional with said longitudinal axis and being more remote therefrom as compared with said leading cutting edge portion;

characterized in that said trailing cutting edge portion when in its operative position is located above a reference plane parallel to a plan view of the tool and passing through said longitudinal axis, whilst its associated relief flank surface is directed at a first internal acute angle to said reference plane; the remaining side surfaces of said insert and the abutting side walls of said pocket respectively, converging towards each other in a direction away from said operative cutting edge; at least one of said abutting side surfaces of the insert being directed at a second internal acute angle to said reference plane; at least one of the converging side walls of said pocket sloping towards the base wall of the pocket at said second acute angle substantially equal to said acute angle so as to be retainably abutted by one abutting side surface Thus, the cutting insert according to the second aspect of present invention is designed for culling diameters still smaller than that of the insert according to the first aspect of the present invention, e.g. about 8 mm and less, and therefore has only one cutting edge. The geometry of this one cutting edge is completely identical to the geometry of the operative cutting edge of the insert having two cutting edges and the clamping mechanisms of both inserts are substantially the same. Therefore, the insert according to the second aspect of the present invention has all the relevant advantages described above.

BRIEF DESCRIPTION OF THE DRAWINGS

For a better understanding of the present invention, and to show how the same may be carried out in practice in connection with particular examples thereof, reference will now be made to the accompanying drawings, in which:

FIG. 9 is a plain view of an enlarged scale of a leading head portion of the cutting tool in FIG. 1a;

FIG 10 and 11 are cross-sectional views of the cutting tool shown in FIG. 9 taken respectively along the lines X—X and XI—XI perpendicular to a base of the pocket;

DETAILED DESCRIPTION OF PREFERRED EMBODIMENTS

Figure 1A:
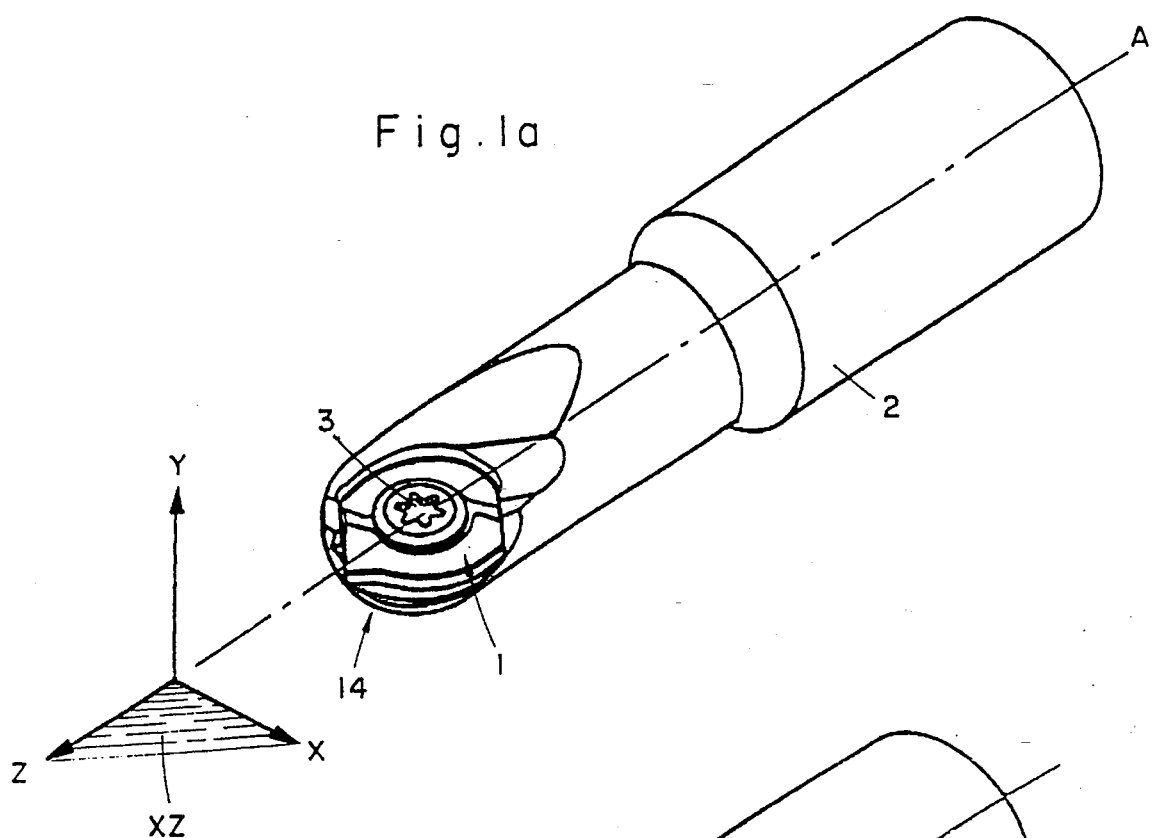
FIGS. 1a and 1b are respectively perspective and exploded views of a cutting tool in accordance with the present invention.
Figure 1B:
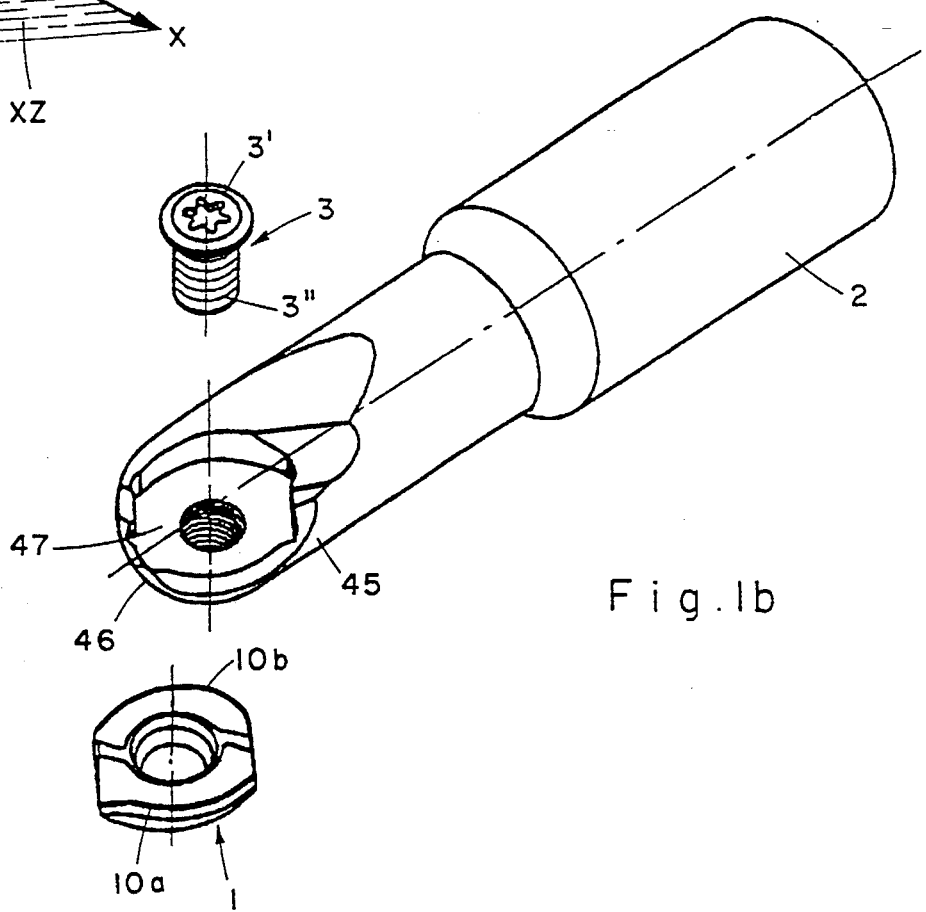
Figure 4:
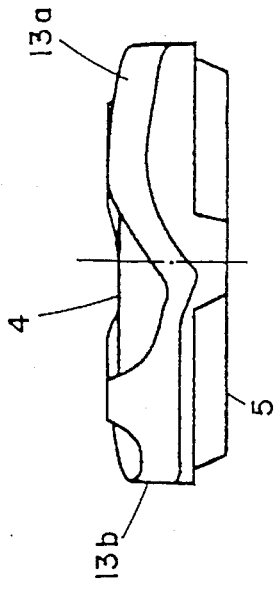
FIGS. 2, 3, 4 and 5 respectively perspective, plan, front and side views of a cutting insert forming a part of the cutting tool shown in FIGS. 1a and 1b.
Figure 2:
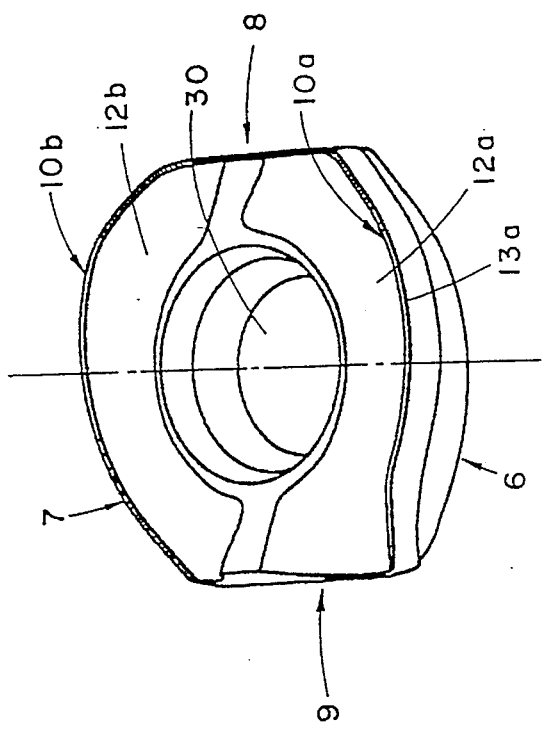

FIGS. 1a and 1b illustrate a metal cutting tool, namely, a ball-end milling tool, according to a preferred embodiment of the present invention. The metal cutting tool comprises a cutting insert 1, a tool holder 2 and a clamping screw 3 formed with a conical portion (not seen) which tapers from a screw head 3' to a screw threaded portion 3" The cutting tool has a reference plane XZ perpendicular to the height direction Y of an insert retaining pocket 47 and passing through a longitudinal axis of rotation A coinciding with an axis Z of a three-dimensional coordinate system XYZ shown in FIG. 1a.

The cutting insert 1 shown in FIGS. 2, 3, 4 and 5 is substantially disk-shaped and is formed with a top surface 4, a base surface 5 and major side surfaces 6 and 7 and minor side surfaces 8 and 9. The side surfaces 6, 7, 8 and 9 are substantially perpendicular to the base surface 5 and defining the periphery of the insert 1.

The cutting insert 1 has two indexable curved cutting edges 10a and 10b formed by the intersection of the top surface 4 with the respective side surfaces 6 and 7 and extending along two opposite portions of the periphery of the cutting insert. Portions of the top surface 4 and the side surfaces 6 and 7 adjacent the cutting edges 10a and 10b constitute respectively rake surfaces 12a and 12b and relief flanks 13a and 13b thereof. In view of the fact that the cutting edges have completely identical geometry so as to be indexable into operative cutting positions when the insert 1 is mounted in the tool, only one cutting edge will now be described.

Figure 5:
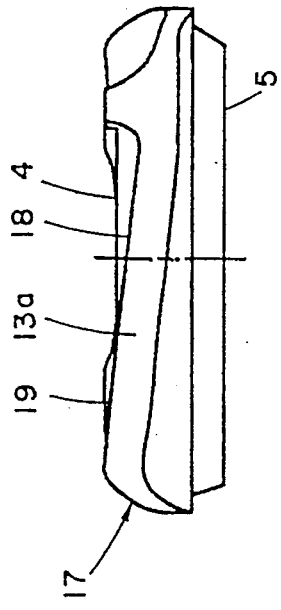
Figure 3:
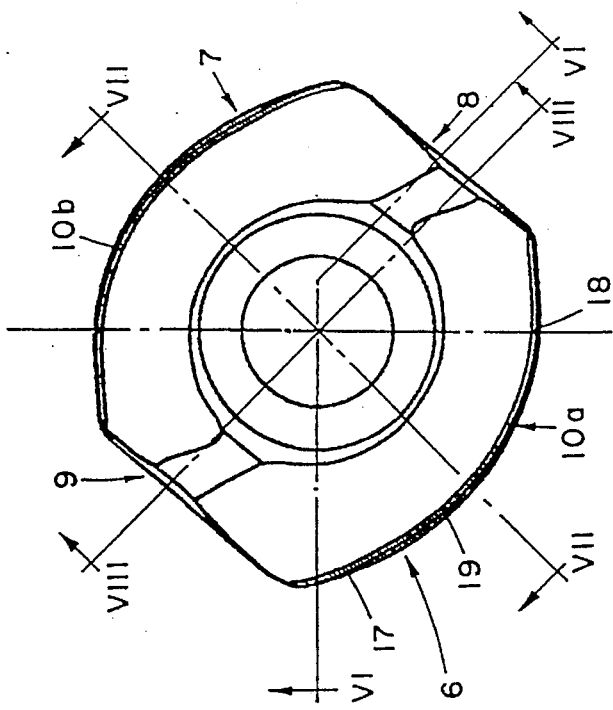
Figure 13:
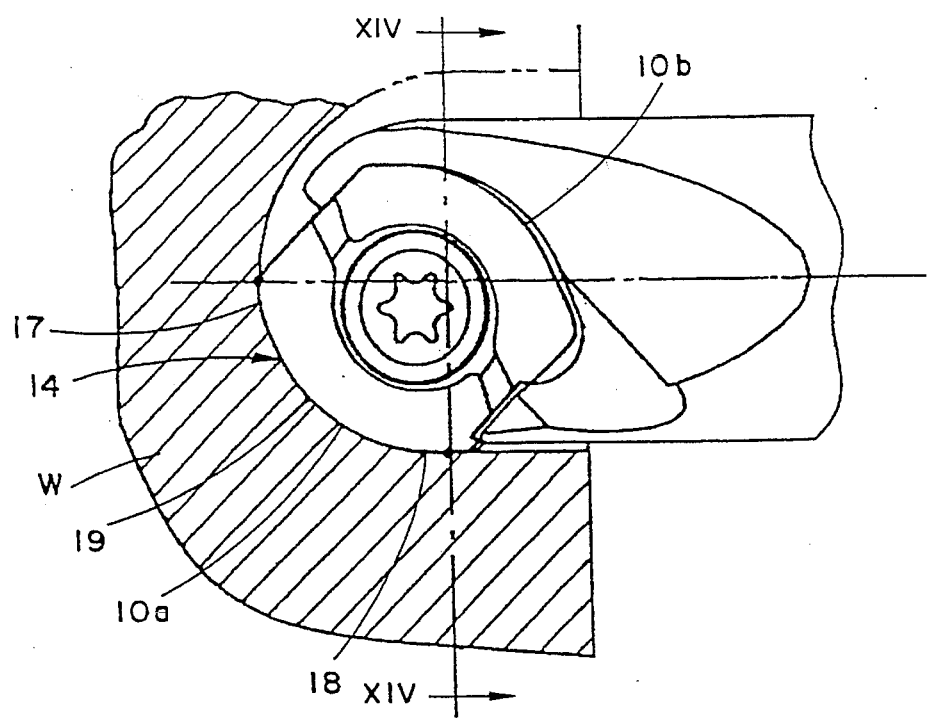

As is clearly seen in FIG. 13, when the cutting edge 10a is in its operative position at a leading end 14 of the tool, it comprises first, a leading cutting edge portion 17 disposed in the vicinity of the longitudinal axis A of the tool, a second trailing cutting edge portion 18 remote from the longitudinal axis A and substantially co-directional therewith and an intermediate cutting edge portion 19 therebetween. The cutting edge portions 17, 18 and 19 are seen also in FIGS. 2 to 5. Thus, as seen in FIG. 5, the trailing cutting edge portion 18 slopes in the direction of the base surface 5 from the leading cutting edge portion 17.

Figure 7:
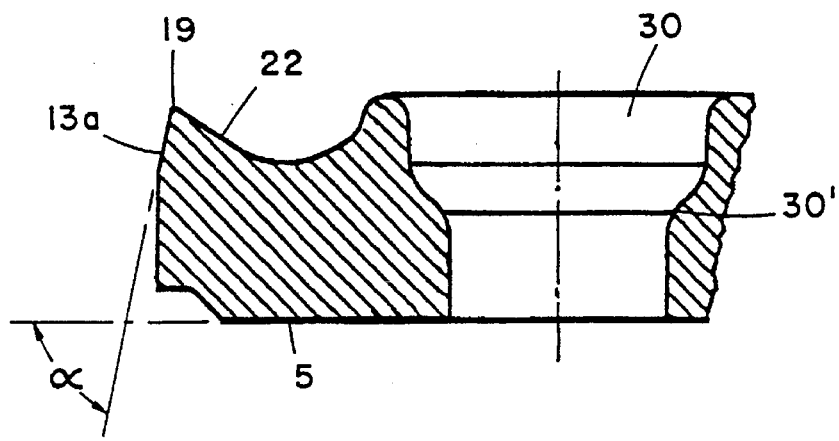
FIGS. 6, 7 and 8 are cross-sectional views of the insert shown in FIG. 3 along the respective lines VI—VI, VII—VII and VIII—VIII.
Figure 8:
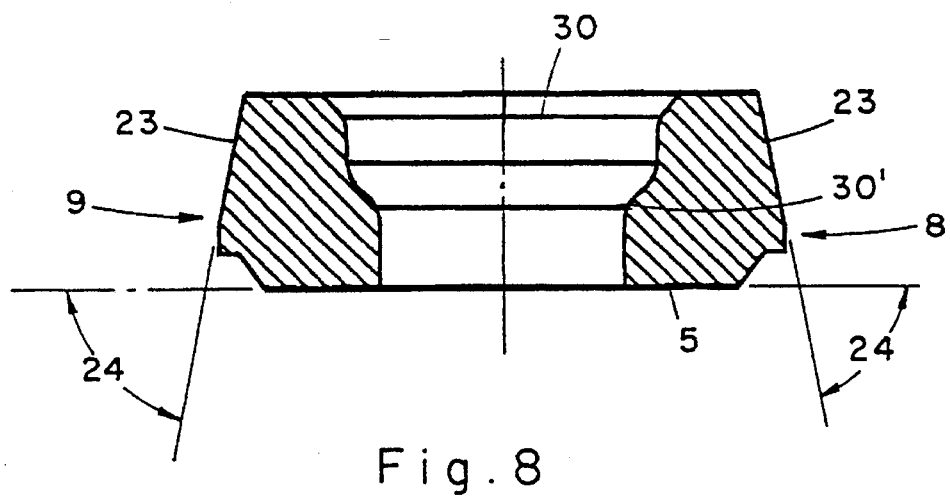
Figure 6:
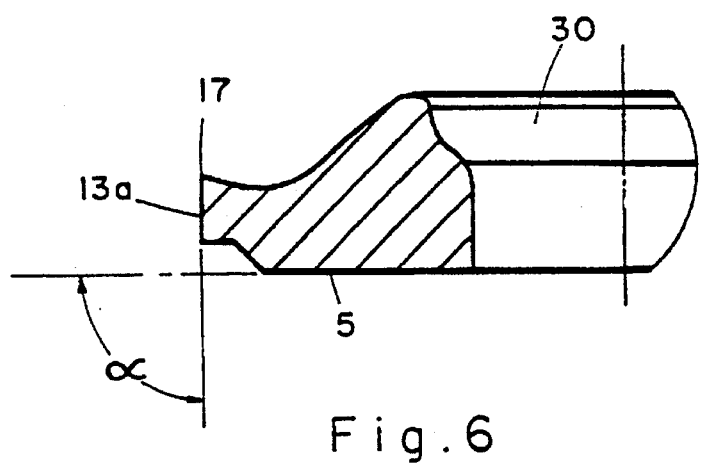

As seen in FIGS. 6 and 7, the relief flank 13a of the cutting edge is inclined with respect to the base surface 5 at an internal angle $\alpha$ having its maximal value, preferably from 70° to 90°, adjacent the leading cutting edge portion 17 (FIG. 6) and being substantially more acute adjacent the intermediate cutting edge portion 19 (FIG. 7) and the trailing cutting portion 18 (not seen). Such a design allows to increase the cutting wedge of the insert and to form the rake surface 12a with a chip forming groove 22 not affecting the strength of the cutting edge. A cutting wedge angle of the insert defined by the chip forming groove 22 varies along the cutting edge in accordance with a required cutting geometry and, especially, so as to provide the cutting edge with positive radial and axial cutting rake angles The side surfaces 8 and 9 shown in FIG. 8 are provided with a bevelled upper portion 23 forming with the base surface 5 an internal acute angle 24.

The insert is formed with a central through bore 30 having countersunk and cylindrical portions merging via a toroidal portion 30' and having dimensions enabling the clamping screw 3 to be freely received therein.

Figure 12:
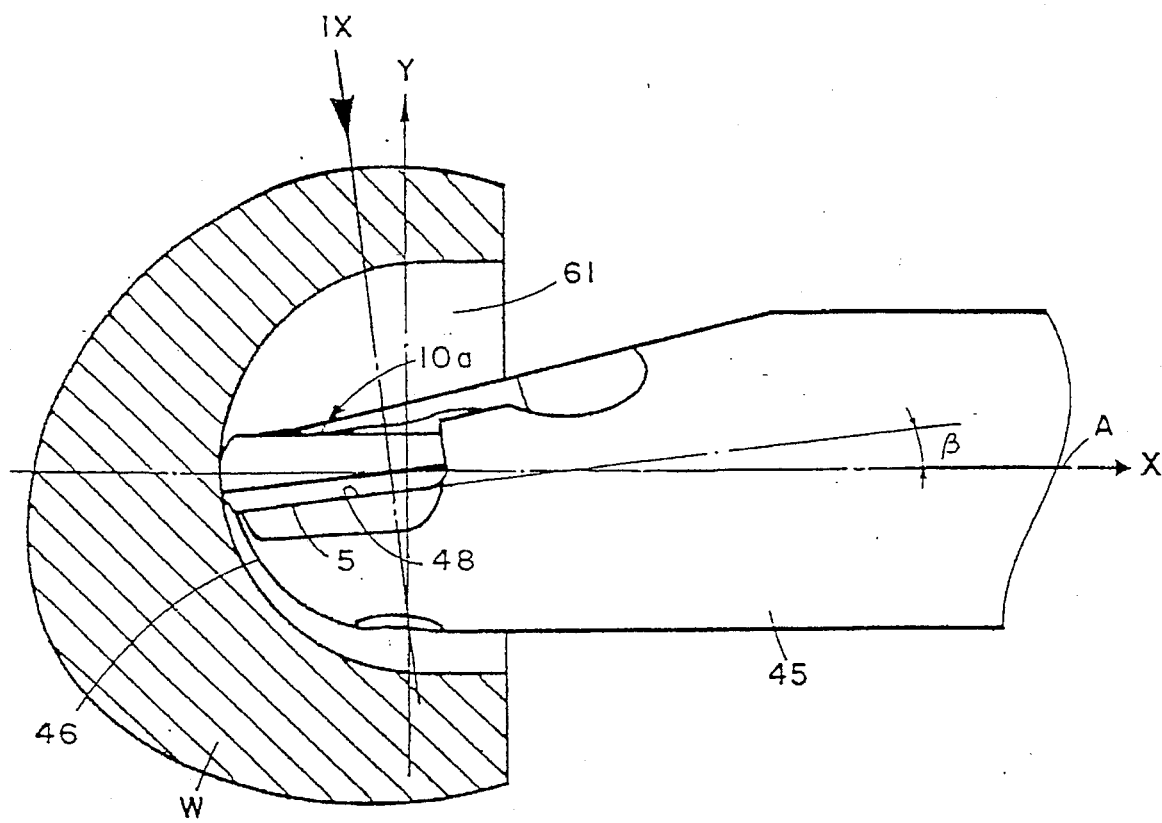
FIGS. 12 and 13 are respectively side and plan views of the assembled cutting tool, according to the invention, during machining operation.

As seen in FIG. 1b, the tool holder 2 is formed with a cylindrical head 45 having a leading end 46. The tool holder head 45 is formed with an insert retaining pocket 47 adapted to receive the insert 1. It is shown in FIGS. 9, 10 and 11 that the pocket 47 has a base 48 and side walls 50 and 51 of a shape matching the shape of the respective side surfaces of the insert, i.e. they converge towards each other in a direction away from the leading end 46 of the tool holder 2 in the same manner as two adjacent side surfaces 7 and 8 of the insert 1 converge towards each other in a direction away from the operative cutting edge 10a. The side wall 50 of the pocket slopes towards the base 48 in a manner similar to that of the relief flank 13b of the inoperative cutting edge 10b and the side wall 51 of the pocket slopes towards the base 48 in the manner corresponding to that of bevelled upper portion 23 of the insert side surface 8. The base 48 of the pocket 47 is slanted with respect to the above-mentioned reference plane XZ at a negative angle $\beta$ (FIG. 12).

The pocket 47 has a centrally disposed threaded bore 55 adapted to be aligned with the insert through bore 30 and to cooperate with the threaded portion 3" of the clamping screw 3.

FIGS. 9, 10 and 11 illustrate that, when the screw 3 secures, in a conventional manner, the cutting insert 1 in the pocket 47 of the tool holder 2, the insert base surface 5 abuts the pocket base 48. Furthermore, the insert side walls 7 and 8, and in particular the portions thereof constituted respectively by the relief flank 13b and the bevelled portion 23, abut the corresponding sloping side walls 50 and 51 of the pocket 47. Thus, due to the specific design of the cutting edges, particularly of their relief flanks, the relief flank 13b of the inoperative cutting edge 10b serves to effectively clamp the insert 1 to the tool holder 2 in a dovetail manner which, as mentioned above, is specifically advantageous for the insert 1 having a small cutting diameter.

Figure 14:
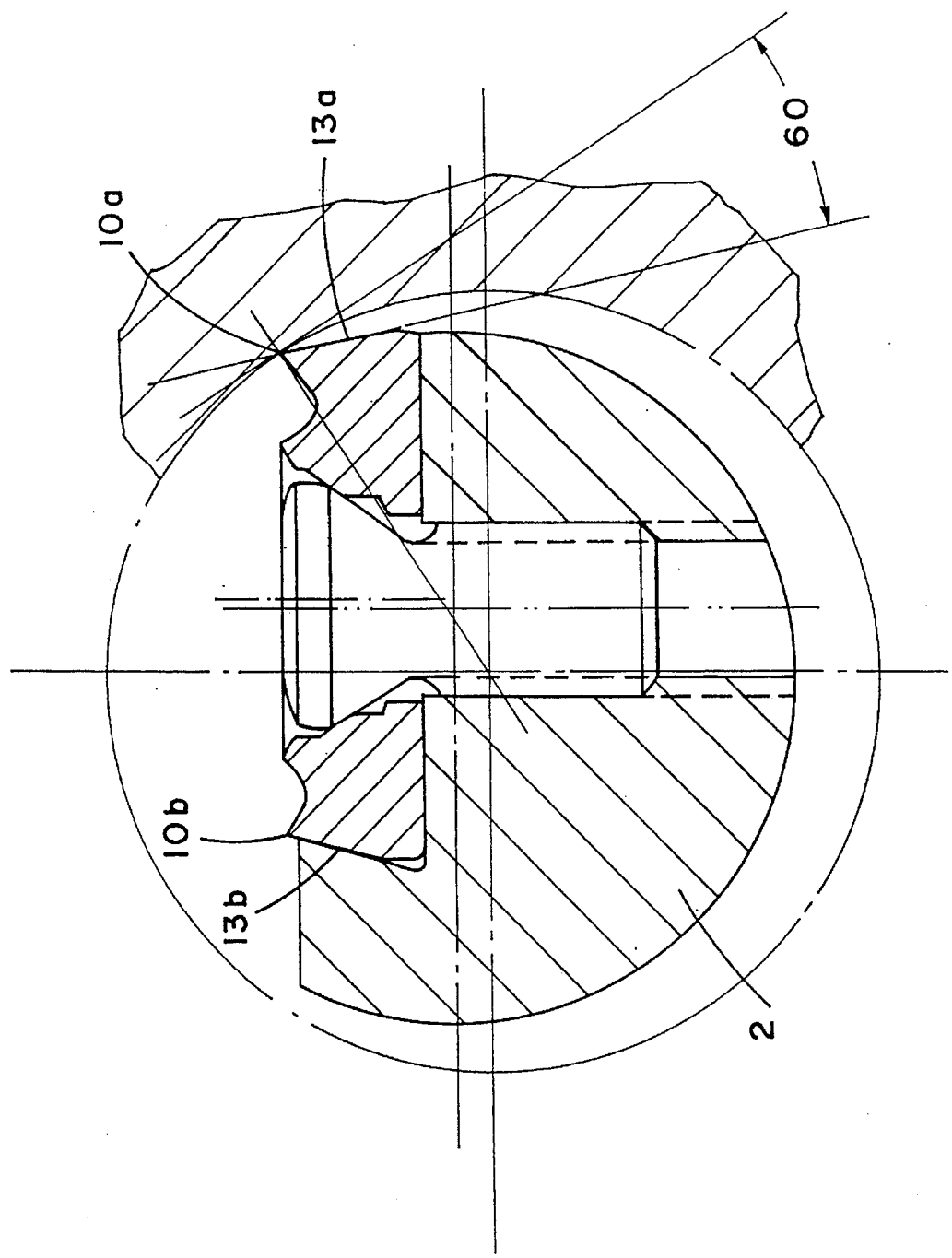
FIG. 14 is a cross-sectional view of the tool shown in FIG. 13 along the line XIV—XIV.

The geometrical configuration of the insert cutting edge and the orientation of the insert in the tool holder are such that during rotation of the cutting tool around the longitudinal axis A, the leading and intermediate cutting edge portions 17 and 19 generate an envelope constituting a segment of a spherical surface having its center on the axis of rotation A, while the trailing cutting edge portion 18 generates an envelope constituting a substantially cylindrical surface. FIGS. 12, 13 and 14 schematically illustrate the disposition of the metal cutting tool during machining of a workpiece W.

It is seen in FIG. 12 that, due to the specific orientation of the base 48 of the pocket 47, the insert is positioned so that most of its body is located above the reference plane XZ, enabling thereby a significant increase of the height of insert supporting portion of the holder head 45 and, consequently, of its strength. On the other hand, there is still left enough space 61 for chip forming and for evacuation thereof from the cutting area. In view of the specific inclination of the base 48 and due to the fact that the trailing cutting edge portion 18 slopes with respect to the base surface 5 of the insert, the trailing cutting edge portion 18 is substantially co-directional with the longitudinal axis A so as to have positive axial rake angle.

FIG. 14 shows that even with the above-described specifically advantageous and non-conventional geometry of the relief flank surface of the trailing cutting edge portion 18, there still exists a relatively large clearance 60 between this relief flank and the workpiece W.

Figure 18B:
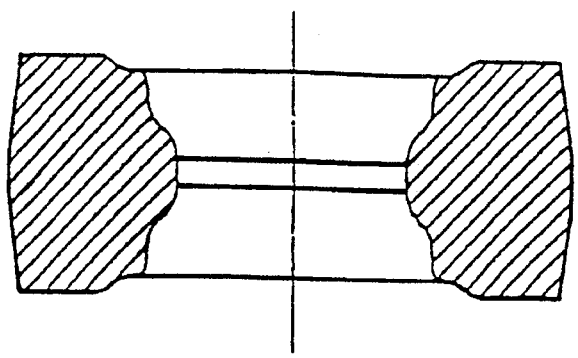
FIGS. 18a and 18b illustrate another embodiment of a double-sided cutting insert in accordance with the present invention.
Figure 18A:
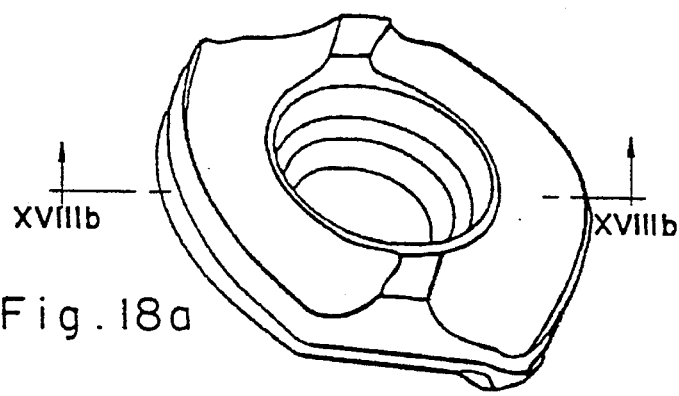
Figure 17A:
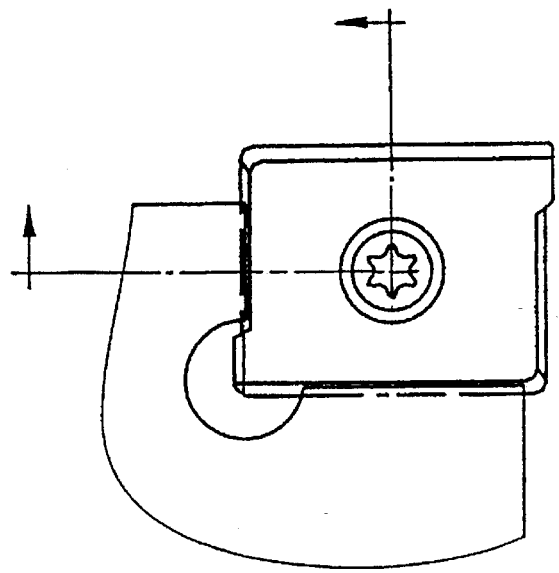
FIGS. 17a and 17b illustrate an alternative embodiment of a cutting insert in accordance with the present invention, which insert has straight cutting edges.
Figure 17B:
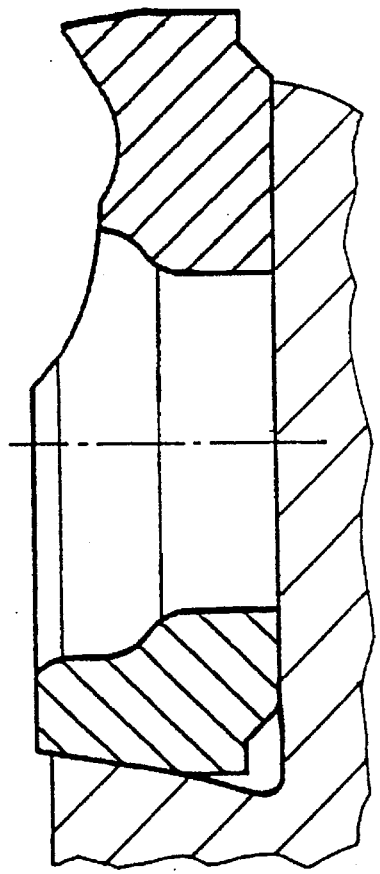

Although in the insert described in the preferred embodiment of the present invention the cutting edges are curved, they may consist of substantially straight cutting edge portions such, for example, as shown in FIGS. 17a and 17b. The insert 1 may be designed with more than two cutting edges disposed at one side thereof or it may also be double-sided, e.g. such as shown in FIGS. 18a and 18b.

Figure 15A:
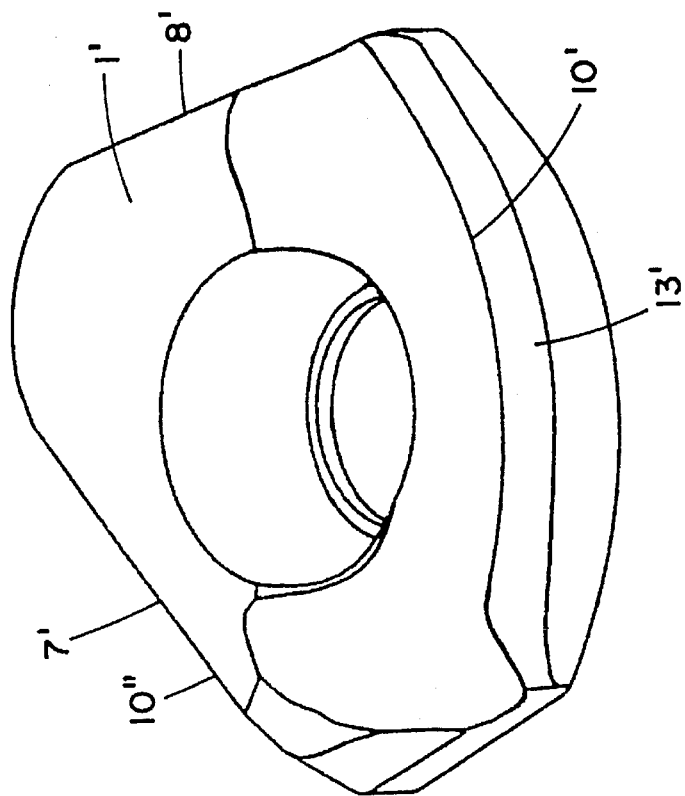
FIGS. 15a and 15b illustrate a perspective view and a top view, respectively, of an alternative embodiment of a cutting insert in accordance with the present invention, which insert has one cutting edge.
Figure 15B:
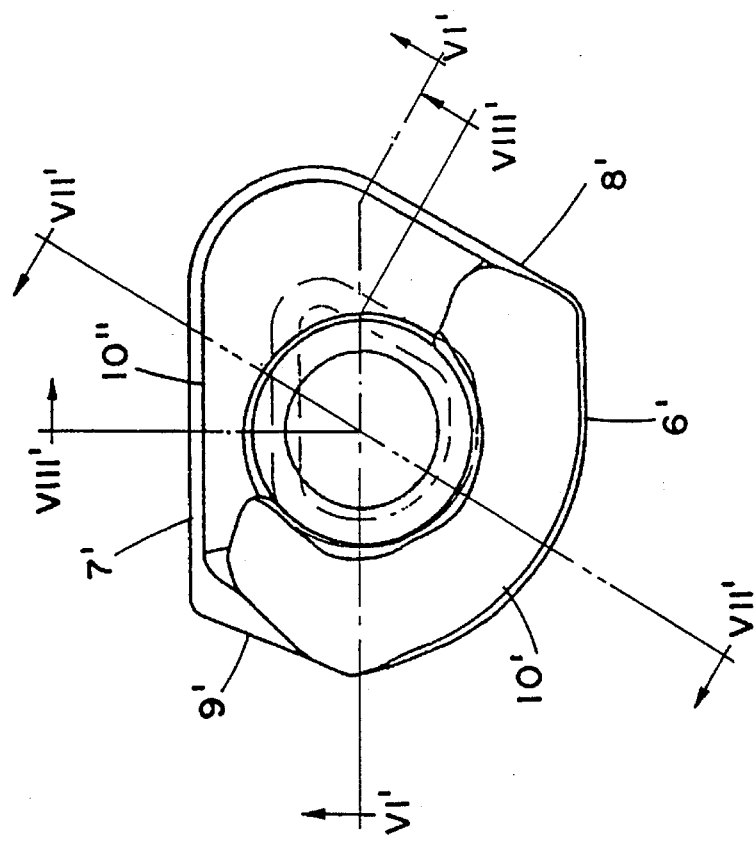

FIGS. 15a and 15b show an alternative embodiment of the insert of the present invention where an insert 1' is designed similarly to the insert 1 of the above preferred embodiment but for small cutting diameters, e.g. of 8 mm and less (i.e. smaller than those of the insert 1). The insert 1' has a single cutting edge 10' with the rest of the insert body designed specifically for retaining and clamping purposes. The cutting edge 10' has a geometry identical to that of the cutting edge 10a of the insert 1 and major side surfaces 6' and 7' and minor side surfaces 8' and 9' have a configuration identical to the corresponding surfaces 6, 7, 8 and 9 of the insert 1. Thus, cross-sectional views along the lines VI'—VI', VII'—VII' and VIII'—VIII' shown in FIG. 15b are completely identical to the corresponding cross-sectional views of the insert 1 shown respectively in FIGS. 6, 7 and 8. It has to be emphasized that the only differences between the inserts 1 and 1' are that the edge 10" of the side surface 7' which is opposite to the cutting edge 10' is a non-cutting edge and is substantially parallel to a trailing cutting edge portion of the cutting edge 10' and that the surfaces 7' and 8' have only clamping function. Therefore, angles of inclination of upper portions 13b' and 23' (not shown) of the respective side surfaces 7' and 8' may be different than that of a relief flank 13' of the cutting edge 10'.

Figure 16B:
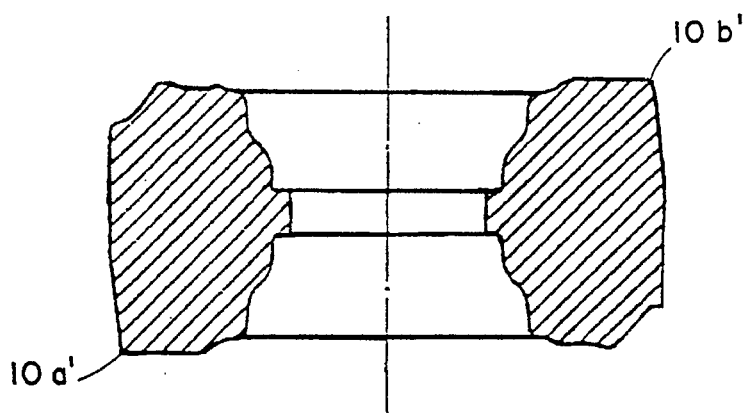
FIGS. 16a and 16b illustrate an alternative embodiment of a cutting insert in accordance with the present invention, the insert being double-sided.
Figure 16A:
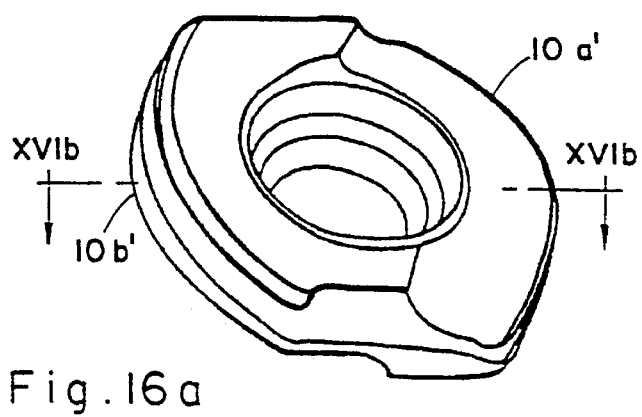

It is to be noted that FIGS. 12 and 14 illustrating the cutting tool with the insert 1 can be used also for illustration of a cutting tool with the insert 1' mounted in a suitably shaped pocket of a tool holder. As seen in FIGS. 16a and 16b, the insert 1' may be double-sided and have cutting edges 10a' and 10b' located on different sides thereof.

It should be mentioned that the components of the cutting tools, according to the present invention, may be of various designs and dimensions depending on specific applications of the tool. Thus, the holder head may be conical rather than cylindrical, the insert side walls and their portions and accordingly the pocket side walls may have different dimensions and different angles of inclination. The side walls of the pocket may have small recessed or projecting portions or some other alternative means to ensure that their contact with the adjacent insert surfaces takes place in predetermined localized positions. The base surfaces of the insert and the pocket may be of a spherical, prismatic or other suitable shape rather that being flat.

The chip cutting tool according to the present invention may be used for machining of workpieces made of different suitable solid materials.

We claim:

1. A chip cutting tool for rotary machining operations comprising:
    a tool holder formed with an insert retaining pocket adjacent a leading end thereof, said pocket comprising a base and side walls, a first side wall sloping towards the pocket base forming a first acute angle, with said pocket base said tool holder having a longitudinal axis of rotation, said axis laying on a reference plane perpendicular to a height direction of said pocket;
    a cutting insert having
        top and base surfaces,
        opposite first and second major side surfaces,
        opposite first and second minor side surfaces,
        a relief flank surface formed on an upper portion of said first major side surface, at least a portion of said relief flank surface directed towards said insert base surface and forming a first internal acute angle therewith,
        a cutting edge defined between said relief flank surface and said top surface, said cutting edge comprising leading and trailing sections, at least a portion of the second major side surface being substantially co-directional with said trailing portion and having an upper region directed towards the insert base at an angle substantially equal to said first acute angle, the second major surface and at least one minor side surface converging in a direction away from the cutting edge; and
    champing means for releasably clamping said insert in said pocket, wherein
        the cutting edge leading section is oriented substantially radially relative to the longitudinal axis,
        the cutting edge trailing section is disposed above the reference plane and is substantially co-directional with the longitudinal axis, being spaced radially outward therefrom,
        said upper region of tile second major side surface abuts said first pocket side wall, and
        the at least one minor side surface abuts a second of said pocket side walls.

2. A chip cutting tool according to claim 1, wherein the internal acute angle decreases from a maximum value adjacent the leading section to a minimum value adjacent the trailing section.

3. A chip cutting tool according to claim 1, wherein the cutting tool is of a substantially ball-ended type, the cutting insert is substantially disk shaped, and the cutting edge is substantially curved and further comprises an intermediate cutting edge section between the leading and trailing sections.

4. A chip cutting tool according to claim 3, wherein during tool rotation, the leading and intermediate sections of the cutting edge generate an envelope constituting a segment of a spherical surface having a center on the longitudinal axis, and the trailing section generates a cylindrical surface.

5. A chip cutting tool according to claim 1, wherein the pocket base is slanted at a negative axial angle with respect to the reference plane.

6. A chip cutting tool according to claim 5, wherein a portion of the cutting edge leading section is below the reference plane.

7. A chip cutting tool according to claim 1 wherein
    the second pocket side wall slopes towards the pocket base and forms a second acute angle therewith, and
    an upper portion of the at least one minor side surface is bevelled with respect to the insert base surface at an angle substantially equal to said second acute angle, said upper portion abutting said second pocket side wall.

8. A chip cutting tool according to claim 1, wherein
    the second and a third pocket side wall slope towards the pocket base and form respective second and third acute angles therewith,
    first and second upper portions of the respective first and second minor side surfaces are bevelled with respect to the insert base surface, said first upper portion bevelled at an angle substantially equal to said second acute angle and said second upper portion bevelled at an angle substantially equal to said third acute angle, and
    said first and second upper portions abut respective said second and third pocket side walls.

9. A chip cutting tool according to claim 1, wherein the upper region of the second major side surface abuts the first pocket side wall at a point adjacent to tile leading end of the tool holder.

10. A chip cutting tool according to claim 1, wherein the second major side surface is substantially co-directional with the longitudinal axis.

11. A chip cutting tool for rotary machining operations comprising:
    a tool holder formed with an insert retaining pocket adjacent a leading end thereof, said pocket comprising a base and side walls, a first of said pocket side walls forming a first acute angle with said pocket base, said tool holder having a longitudinal axis of rotation, said longitudinal axis laying on a reference plane perpendicular to a height direction of said pocket;
    an indexable cutting insert having
        top and base surfaces,
        opposite first and second major side surfaces,
        opposite first and second minor side surfaces,
        first and second relief flank surfaces formed on upper portions of respective major side surfaces, at least a portion of each relief flank surface directed towards said insert base surface and forming a first internal acute angle therewith, the first internal acute angle being substantially equal to said first acute angle, and first and second cutting edges defined between the top surface and respective relief flank surfaces, each cutting edge comprising a leading and a trailing section, said portion of each relief flank directed towards the insert base being adjacent to its corresponding trailing section, and clamping means for releasably clamping said insert in said pocket, wherein the first major side surface and the first cutting edge are indexed into an operative cutting position, the first cutting edge leading section is oriented substantially radially relative to the longitudinal axis, the first cutting edge trailing section is disposed above the reference plane, substantially co-directional with the longitudinal axis and spaced radially outward therefrom, the second major side surface, the second cutting edge and at least portions of the minor side surface are disposed within the pocket, at least one of said portions of the minor side surfaces abutting a second pocket side wall, and the portion of the second relief flank surface directed towards the insert base surface abuts the first pocket side wall.

12. A chip cutting tool according to claim 11, wherein each relief flank surface and the insert base surface form an acute angle along the entire length of the cutting edge.

13. A chip cutting tool according to claim 12, wherein the internal acute angle decreases from a maximum value adjacent the leading section to a minimum value adjacent the trailing section.

14. A chip cutting tool according to claim 11, wherein the cutting tool is of a substantially ball-ended type, the cutting insert is substantially disk shaped, and each cutting edge is substantially curved and further comprises an intermediate cutting edge section between the leading and trailing sections.

15. A chip cutting tool according to claim 14, wherein during tool rotation, the leading and intermediate sections of the first cutting edge generate an envelope constituting a segment of a spherical surface having a center on the longitudinal axis and the trailing section generates a cylindrical surface.

16. A chip cutting tool according to claim 11, wherein the pocket base is slanted at a negative axial angle with respect to the reference plane.

17. A chip cutting tool according to claim 16, wherein a portion of the leading section of the first cutting edge is below the reference plane.

18. A chip cutting tool according to claim 11, wherein the leading and trailing sections are substantially straight.

19. A chip cutting tool according to claim 16, wherein said second pocket side wall slopes toward the pocket base and forms a second acute angle therewith and an upper portion of at least one minor side surface is bevelled with respect to the insert base surface at an angle substantially equal to said second acute angle, said upper portion of said at least one minor side surface abutting the second pocket side wall.

20. A chip cutting tool according to claim 11 wherein a second and a third of said pocket side walls slope towards the pocket base and form respective second and third acute angles therewith, and upper portions of both minor side surfaces are bevelled with respect to the insert base surface, a first upper portion bevelled at an angle substantially equal to said second acute angle, and a second upper portion bevelled at an angle substantially equal to said third acute angle, said first and second upper portions abutting respective said second and third pocket side walls.

* * * * *